(12) United States Patent
Fujikawa et al.

(10) Patent No.: US 7,572,400 B2
(45) Date of Patent: Aug. 11, 2009

(54) PRODUCTION METHOD FOR A NANOMATERIAL

(75) Inventors: Shigenori Fujikawa, Wako (JP); Toyoki Kunitake, Wako (JP)

(73) Assignees: Tokyo Ohka Kogyo Co., Ltd., Kawasaki-shi (JP); Riken, Saitama-ken (JP)

( * ) Notice: Subject to any disclaimer, the term of this patent is extended or adjusted under 35 U.S.C. 154(b) by 776 days.

(21) Appl. No.: 10/840,192

(22) Filed: May 6, 2004

(65) Prior Publication Data

US 2008/0187724 A1   Aug. 7, 2008

(30) Foreign Application Priority Data

Nov. 27, 2003   (JP)   .......................... P 2003-397467
Dec. 24, 2003   (JP)   .......................... P 2003-427386
Mar. 26, 2004   (JP)   .......................... P 2004-091414

(51) Int. Cl.
    *B29C 59/02*   (2006.01)
(52) U.S. Cl. ........................ 264/220; 264/259; 264/255; 264/319; 264/293
(58) Field of Classification Search ........................ None
    See application file for complete search history.

(56) References Cited

U.S. PATENT DOCUMENTS 5,955,240 A   9/1999   Sato et al.

6,387,587 B1   5/2002   Oomori et al.

FOREIGN PATENT DOCUMENTS

EP   1767491 A1 *   3/2007
JP   2003077922   *   3/2003

OTHER PUBLICATIONS

Caruso, *Nanoengineering of Particle Surfaces*, Advanced Material, vol. 13 No. 1, p. 11-22, (2001).
Fujikawa et al, *Polymer Preprints*, 52nd Annual Meeting of The Society of Polymer Science, May 28-30, 2003, Nagoya, Japan vol. 52, No. 3.
Madou, Marc J., *Fundamentals of Microfabrication: The Science of Miniaturization*, Second Edition, CRC Press, Washington, D.C., pp. 66-67, (2002).

* cited by examiner

*Primary Examiner*—Edmund H. Lee
(74) *Attorney, Agent, or Firm*—Knobbe, Martens, Olson & Bear, LLP

(57) ABSTRACT

A production method for a nanomaterial comprising the steps of: forming a template on a solid substrate using a metal oxide nanomaterial forming composition including an organic compound with a phenolic hydroxyl group and a molecular weight of at least 500, forming a metal oxide layer on the template, and removing the template to generate a metal oxide nanostructure.

14 Claims, 5 Drawing Sheets

PRODUCTION METHOD FOR A NANOMATERIAL

BACKGROUND OF THE INVENTION

1. Field of the Invention

The present invention relates to a production method for nanomaterials, and more specifically to a method of producing a three dimensional nanostructure using a template with a very fine pattern formed thereon, as well as a metal oxide nanomaterial forming composition and a template used in such a method, and a metal oxide nanostructure.

Priority is claimed on Japanese Patent Application No. 397467, filed Nov. 27, 2003, Japanese Patent Application No. 427386, filed Dec. 24, 2003, and Japanese Patent Application No. 91414, filed Mar. 26, 2004, the contents of which are incorporated herein by reference.

2. Description of Related Art

Nanomaterials comprising a metal oxide with a three dimensional nanostructure, or nanomaterials comprising a composite material of an organic compound and a metal oxide with a three dimensional nanostructure display different physical and chemical characteristics from the corresponding bulk materials, and are consequently attracting considerable interest in terms of both fundamental research and applied research. For example, nanomaterials with a hollow three dimensional structure are expected to prove extremely useful in a wide variety of fields, including inclusion chemistry, electrochemistry, material science, biomedicine, sensors, catalysis and separation technology.

The template method is a conventional technique used for producing nanomaterials. In the template method, fine template particles are dispersed in a solvent, and once the surface of these fine template particles have been coated with a thin membrane, the fine template particles are removed, thereby producing a spherical capsule shaped nanomaterial with a hollow three dimensional structure (for example, see the non-patent reference 1). However in this method, the formation of nanosize template particles capable of dispersion within a solvent is problematic, and when designing the template particles, there is little freedom in terms of the shape of the three dimensional structure.

On the other hand, methods of fabricating three dimensional structures directly using laser stereolithography are also known (for example, see non-patent reference 2). However in these methods, the size of the pattern fabricated on a solid substrate is in the micrometer range, and the fabrication of nanosize structures is almost impossible, meaning these methods cannot be used for further size miniaturization.

In response to these problems, the inventors of the present invention have proposed a method of producing a nanomaterial with an ultra thin three dimensional membrane structure by coating the surface of a template with a nanopattern formed thereon with an ultra thin titania film, and then removing the template (see non-patent reference 3).

(Non-patent reference 1) Frank Caruso, "Nanoengineering of particle surfaces", Advanced Materials 13(1), pp. 11-22 (2001).

(Non-patent reference 2) Marc J. Madou, "Fundamentals of Microfabrication: The Science of Miniaturization", second edition, CRC Press (USA), pp. 66-67.

(Non-patent reference 3) "Polymer Preprints, Japan", published May 8, 2003, vol. 52 (2003), No. 3, p. 471.

The method disclosed in the above non-patent reference 3 permits a high degree of freedom in terms of the template shape, although it is still somewhat satisfactory in terms of reproducibility and reliability, so that depending on the template material, an ultra thin three dimensional film structure of favorable shape may not be achievable.

SUMMARY OF THE INVENTION

The present invention takes the above circumstances into consideration, with an object of providing a production method for a nanomaterial which offers a high degree of freedom in terms of shape design, can be applied to further miniaturization, and provides superior reliability and reproducibility.

Furthermore, another object of the present invention is to provide a metal oxide nanomaterial forming composition and a template that can be favorably used in the above nanomaterial production method, as well as a metal oxide nanostructure produced using the template.

In order to achieve the above objects, the present invention provides the aspects described below.

Namely, a production method for a nanomaterial according to the present invention comprises the steps of: forming a template on a solid substrate using a metal oxide nanomaterial forming composition comprising an organic compound with a phenolic hydroxyl group and a molecular weight of at least 500, forming a metal oxide layer on the template, and removing the template to generate a metal oxide nanostructure.

The present invention also provides a metal oxide nanomaterial forming composition comprising an organic compound with a phenolic hydroxyl group and a molecular weight of at least 500.

The present invention also provides a metal oxide nanomaterial forming composition used in the formation of a template in a production method for a metal oxide nanomaterial according to the present invention.

The present invention also provides a template generated using a metal oxide nanomaterial forming composition according to the present invention.

The present invention also provides a metal oxide nanostructure generated by forming a metal oxide layer on a template of the present invention, and then removing the template.

According to the present invention, by using a composition comprising a specific organic compound as the material for forming the template, and then forming a metal oxide layer on that template and subsequently removing the template, a metal oxide nanostructure with a shape that has been duplicated or transferred from the template can be produced with good shape retention, and with favorable reliability and reproducibility. Furthermore, fine control of the template shape is also possible, meaning the shape of the nanomaterial can be designed with a high degree of freedom.

BRIEF DESCRIPTION OF THE DRAWINGS

FIG. 7A and FIG. 7B are scanning electron microscope images of a titania nanotube material prepared in an example 7, wherein FIG. 7A represents a top view of the material and FIG. 7B represents a cross sectional view.

FIG. 8A and FIG. 8B are scanning electron microscope images of a titania nanotube material prepared in an example 8, wherein FIG. 8A represents a top view of the material and FIG. 8B represents a cross sectional view.

DETAILED DESCRIPTION OF THE INVENTION

Figure 1:
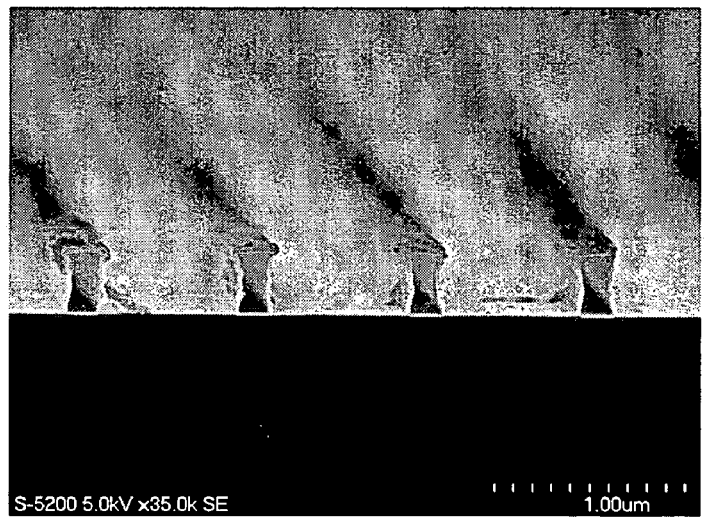
FIG. 1 is a scanning electron microscope image showing a cross sectional view of a titania nanotube material prepared in an example 1.

As follows is a more detailed description of the present invention.

In this description, a "-" symbol positioned between two numbers describes a range of numbers in which the two numbers represent the minimum value and the maximum value respectively within that range. Furthermore, in this description the term "nanostructure" refers to a three dimensional structure in which at least a portion of the structure displays nanometer level dimensions. Examples of such structures include a closed shell or a partially open hollow structure with a thickness at the nanometer level. Furthermore, the term nanostructure includes not only single hollow structures, but also structures in which a plurality of hollow bodies are assembled together. Furthermore, the term "unit" refers to a structural unit in a polymer, that is, a monomer unit.

[Production Method for Nanomaterials]

<Solid Substrate>

In a production method of the present invention, first a template is formed on a solid substrate.

There are no particular restrictions on the solid substrate, provided a template can be formed thereon.

The substrate preferably either has a surface that comprises reactive groups (preferably hydroxyl groups or carboxyl groups), or is a solid substrate into which reactive groups can be introduced. Representative examples of the solid substrate used in the present invention include substrates formed from metals such as silicon and aluminum, inorganic materials such as glass, titanium oxide, silica and mica, and organic materials such as acrylic sheets, polystyrene, cellulose, cellulose acetate and phenol resins. Solid substrates comprising a silicon wafer or a glass sheet are particularly preferred.

There are no particular restrictions on the shape or size of the solid substrate. The solid substrate need not necessarily have a smooth surface, and substrates formed from a variety of different materials in a variety of different shapes can be favorably employed. For example, substrates with curved surfaces, flat sheets with uneven surfaces and thin slice shaped substrates can all be used.

<Metal Oxide Nanomaterial Forming Composition>

In the present invention, a metal oxide nanomaterial forming composition is used for forming the template.

A metal oxide nanomaterial forming composition of the present invention comprises an organic compound with a phenolic hydroxyl group and a molecular weight of at least 500. By employing such a composition, a high density metal oxide layer can be formed on the template formed from the composition, enabling the formation of a three dimensional nanostructure or nanomaterial with a favorable shape.

The organic compound contained within the metal oxide nanomaterial forming composition of the present invention can be broadly classified either as a low molecular weight compound with a molecular weight of 500 to 2000, or as a high molecular weight compound with a molecular weight exceeding 2000. In the case of a high molecular weight compound, the molecular weight value refers to the polystyrene equivalent weight average molecular weight determined using GPC.

If the molecular weight of the organic compound is less than 500 then formation of a nanolevel template is difficult, and consequently such compounds are undesirable.

The phenolic hydroxyl group content within the organic compound contained within the metal oxide nanomaterial forming composition affects the quantity of phenolic hydroxyl groups (reactive groups) per unit area on the surface of the template, and consequently has an effect on the density of the metal oxide layer formed on the template. Accordingly, the presence of these phenolic hydroxyl groups enables the formation of a high density metal oxide layer on the template, thus enabling the production of a nanostructure with a shape that displays good mechanical strength.

In those cases where the organic compound is an aforementioned high molecular weight compound, the quantity of phenolic hydroxyl groups is preferably at least 0.2 equivalents, and even more preferably within a range from 0.5 to 0.8 equivalents.

This means that if the high molecular weight compound comprises a structural unit containing a phenolic hydroxyl group as well as other structural units, then the former structural unit represents at least 20 mol %, and even more preferably from 50 to 80 mol %, of the total structural units.

Furthermore, in those cases where the organic compound is an aforementioned high molecular weight compound, resins with a weight average molecular weight of 2000 to 30,000, comprising a unit containing the phenolic hydroxyl group and a unit containing an acid dissociable, dissolution inhibiting group, wherein the former unit accounts for at least 50 mol %, are preferred. Resins in which the former unit containing the phenolic hydroxyl group is a unit derived from hydroxystyrene are particularly desirable.

In contrast, in those cases where the organic compound is an aforementioned low molecular weight compound, the quantity of phenolic hydroxyl groups is preferably within a range from 1 to 20 equivalents, and even more preferably from 2 to 10 equivalents per molecule of the low molecular weight compound.

The expression "from 1 to 20 equivalents of phenolic hydroxyl groups per molecule" means that 1 to 20 phenolic hydroxyl groups exist within each molecule of the compound.

A metal oxide nanomaterial forming composition of the present invention may be any composition which comprises an organic compound with a phenolic hydroxyl group and a molecular weight of at least 500, and is capable of forming the desired pattern shape. Examples of methods for forming the pattern shape include imprinting methods and lithography methods. Lithography methods using a radiation sensitive composition are preferred.

Cases in which the metal oxide nanomaterial forming composition displays radiation sensitivity are preferred, as lithography can then be used for forming the template from the metal oxide nanomaterial forming composition, which enables a very fine pattern to be formed with a high degree of precision.

As follows is a description of embodiments of the metal oxide nanomaterial forming composition of the present invention.

(1) One example of a radiation sensitive composition containing a high molecular weight compound as the organic compound is a metal oxide nanomaterial forming composition comprising (A-1) a high molecular weight compound containing an acid dissociable, dissolution inhibiting group, and (B) an acid generator.

(2) One example of a radiation sensitive composition containing a low molecular weight compound as the organic compound is a metal oxide nanomaterial forming composition comprising (A-2) a low molecular weight compound containing an acid dissociable, dissolution inhibiting group, and (B) an acid generator.

In the metal oxide nanomaterial forming compositions of (1) and (2) above, a combination of the component (A-1) and the component (A-2) can also be used.

The component (A-1) and the component (A-2) may utilize either one, or a mixture of two or more, of the organic compounds typically used in chemically amplified resists, provided the compound or compounds have a phenolic hydroxyl group and a molecular weight of at least 500.

A more detailed description is provided below.

<Component (A-1)>

The component (A-1) can use either an alkali soluble resin or a resin that can be converted to an alkali soluble state. The former case represents so-called negative radiation sensitivity, and the latter case so-called positive radiation sensitivity. The positive type is preferred.

In the case of negative radiation sensitivity, a cross linking agent is added to the metal oxide nanomaterial forming composition together with the component (B). Then, during template pattern formation using lithography, when acid is generated from the component (B) by exposure, this acid acts on the cross linking agent, causing cross linking between the component (A-1) and the cross linking agent, and making the composition alkali insoluble. The cross linking agent typically uses a melamine compound with a methylol group or an alkoxymethyl group, or an amino based cross linking agent such as urea or glycoluril.

In the case of positive radiation sensitivity, the component (A-1) is an alkali insoluble resin with a so-called acid dissociable, dissolution inhibiting group, and when acid is generated from the component (B) by exposure, this acid causes the acid dissociable, dissolution inhibiting group to dissociate, making the component (A-1) alkali soluble.

Ideal materials for the component (A-1) include novolak resins, hydroxystyrene based resins, and copolymer resins comprising structural units derived from hydroxystyrene and structural unit derived from a (meth)acrylate ester.

In this description, the term "(meth)acrylate" is a generic term covering both methacrylate and acrylate. A structural unit derived from a (meth)acrylate ester refers to a structural unit formed by cleavage of the ethylene double bond of the (meth)acrylate ester, and is hereafter referred to as a (meth)acrylate structural unit. A unit derived from hydroxystyrene refers to a structural unit formed by cleavage of the ethylene double bond of the hydroxystyrene, and is hereafter referred to as a hydroxystyrene unit.

There are no particular restrictions on the ideal resin component for the component (A-1), and suitable examples include positive resist resin components comprising a structural unit (a1) described below, containing a phenolic hydroxyl group, at least one structural unit selected from the units (a2) and (a3) described below, containing an acid dissociable, dissolution inhibiting group, and where necessary an alkali insoluble unit such as the structural unit (a4) described below.

This resin component displays increased alkali solubility under the action of acid. In other words, under the action of the acid generated from the acid generator by exposure, cleavage occurs within the structural unit (a2) and the structural unit (a3), causing the resin, which was initially insoluble in alkali developing liquid, to develop alkali solubility.

As a result, by conducting exposure and then developing, a chemically amplified positive pattern can be formed.

Structural Unit (a1)

The structural unit (a1) is a unit containing a phenolic hydroxyl group, and can be represented by the general formula (I) shown below.

[Chemical Formula 1]

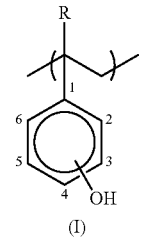

(I)

(wherein, R represents either —H or —CH$_3$)

There are no particular restrictions on the unit provided R represents either —H or —CH$_3$. There are no particular restrictions on the position at which the —OH group is bonded to the benzene ring, although bonding at the position labeled 4 in the above formula (the para position) is preferred.

The structural unit (a1) typically accounts for 40 to 80 mol %, and preferably from 50 to 80 mol % of the resin. By ensuring a quantity of at least 40 mol %, the solubility in the alkali developing liquid can be improved and an improved pattern shape can also achieved, and by ensuring a quantity of no more than 80 mol %, a better balance can be achieved with the other structural units. If the quantity of the structural unit (a1) within the resin is set to at least 50 mol %, and preferably at least 60 mol %, and most preferably at least 75 mol % but no more than 80 mol %, then the presence of the phenolic hydroxyl groups enables the formation of a favorable metal oxide layer on the template, and the production of a nanostructure of superior shape.

Structural Unit (a2)

The structural unit (a2) is a structural unit containing an acid dissociable, dissolution inhibiting group, and can be represented by the general formula (II) shown below.

[Chemical Formula 2]

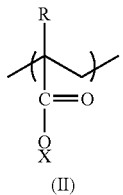

(II)

(wherein, R represents either —H or —CH$_3$, and X represents an acid dissociable, dissolution inhibiting group)

There are no particular restrictions on the unit provided R represents either —H or —CH$_3$.

Examples of the acid dissociable, dissolution inhibiting group X include alkyl groups with a tertiary carbon atom, wherein the tertiary carbon atom within the tertiary alkyl group is bonded to the ester group (—C(O)O—) shown in the formula (II), as well as cyclic acetal groups such as a tetrahydropyranyl group or a tetrahydrofuranyl group.

The acid dissociable, dissolution inhibiting group X can also use other groups typically used in chemically amplified positive resist compositions.

Examples of preferred forms of the structural unit (a2) include those units represented by the chemical formula 3 shown below.

[Chemical Formula 3]

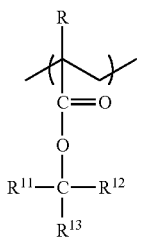

In this formula, R is as defined above, and $R^{11}$, $R^{12}$ and $R^{13}$ each represent, independently, a lower alkyl group (which may be either a straight chain or a branched chain, but preferably comprises from 1 to 5 carbon atoms). Alternatively, two of these groups may be bonded together to form a monocyclic or polycyclic alicyclic group (in which the number of carbon atoms in the alicyclic group is preferably from 5 to 12).

In those cases where an alicyclic group is not formed, a unit in which $R^{11}$, $R^{12}$ and $R^{13}$ each represent a methyl group is preferred.

In those cases where an alicyclic group is formed, then in the case of a monocyclic alicyclic group, units containing a cyclopentyl group or a cyclohexyl group are preferred.

In the case of a polycyclic alicyclic group, examples of preferred units include those represented by the chemical formula 4 and the chemical formula 5 shown below.

[Chemical Formula 4]

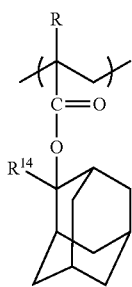

[wherein, R is as defined above, and $R^{14}$ represents a lower alkyl group (which may be either a straight chain or a branched chain, but preferably comprises from 1 to 5 carbon atoms)]

[Chemical Formula 5]

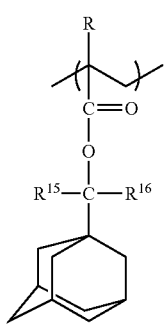

[wherein, R is as defined above, and $R^{15}$ and $R^{16}$ each represent, independently, a lower alkyl group (which may be either a straight chain or a branched chain, but preferably comprises from 1 to 5 carbon atoms)]

The structural unit (a2) typically accounts for 5 to 50 mol %, and preferably from 10 to 40 mol %, and even more preferably from 10 to 35 mol %, of the resin.

Structural Unit (a3)

The structural unit (a3) is also a structural unit with an acid dissociable, dissolution inhibiting group, and can be represented by the general formula (III) shown below.

[Chemical Formula 6]

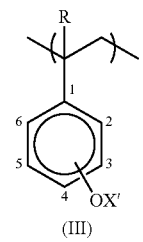

(III)

(wherein, R represents either —H or —$CH_3$, and X' represents an acid dissociable, dissolution inhibiting group)

Examples of the acid dissociable, dissolution inhibiting group X' include tertiary alkyloxycarbonyl groups such as a tert-butyloxycarbonyl group or a tert-amyloxycarbonyl group; tertiary alkyloxycarbonylalkyl groups such as a tert-butyloxycarbonylmethyl group or a tert-butyloxycarbonylethyl group; tertiary alkyl groups such as a tert-butyl group or a tert-amyl group; cyclic acetal groups such as a tetrahydropyranyl group or a tetrahydrofuranyl group; and alkoxyalkyl groups such as an ethoxyethyl group or a methoxypropyl group.

Of these groups, a tert-butyloxycarbonyl group, tert-butyloxycarbonylmethyl group, tert-butyl group, tetrahydropyranyl group or ethoxyethyl group are preferred.

The acid dissociable, dissolution inhibiting group X' can also use other groups typically used in chemically amplified positive resist compositions.

In the general formula (III), there are no particular restrictions on the position at which the —OX' group is bonded to the benzene ring, although bonding at the position labeled 4 in the above formula (the para position) is preferred.

The structural unit (a3) typically accounts for 5 to 50 mol %, and preferably from 10 to 40 mol %, and even more preferably from 10 to 35 mol %, of the resin component.

Structural Unit (a4)

The structural unit (a4) is an alkali insoluble unit, and can be represented by the general formula (IV) shown below.

[Chemical Formula 7]

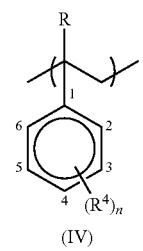

(IV)

(wherein, R represents either —H or —CH$_3$, R$^4$ represents a lower alkyl group, and n represents either 0, or an integer from 1 to 3)

The lower alkyl group of the group R$^4$ may be either a straight chain or a branched chain, but preferably comprises from 1 to 5 carbon atoms.

n is either 0, or an integer from 1 to 3, but is preferably 0.

The structural unit (a4) typically accounts for 1 to 40 mol %, and preferably from 5 to 25 mol % of the resin component. By ensuring a quantity of at least 1 mol %, a significant shape improvement effect can be achieved (particularly in terms of improving the film thinning described below), and by ensuring a quantity of no more than 40 mol %, a better balance can be achieved with the other structural units.

The component (A-1) must contain the structural unit (a1) and at least one of the structural units (a2) and (a3), and may also contain a structural unit (a4). Furthermore, the component (A-1) may be a copolymer containing all of the structural units, or a mixture of a plurality of different polymers each containing at least one of the structural units. Combinations of these two possibilities are also possible.

Furthermore, the component (A-1) may also comprise other units other than the structural units (a1), (a2), (a3) and (a4) described above, although the structural units (a1), (a2), (a3) and (a4) preferably account for at least 80 mol %, and even more preferably at least 90 mol %, and most preferably 100 mol % of the component.

Particularly preferred configurations for the component (A-1) include:
  a copolymer (1) containing a structural unit (a1) and a structural unit (a3), or a mixture of two or more different copolymers of this type, or
  a copolymer (2) containing a structural unit (a1), a structural unit (a2) and a structural unit (a4), or a mixture of two or more different copolymers of this type, as either of these two configurations, or a mixture of the two, offer a simple way of achieving the desired effects. Furthermore, they also provide a favorable improvement in the heat resistance.

In the case of a mixture of the two configurations, the weight ratio between the copolymer (1) and the copolymer (2) is typically within a range from 1/9 to 9/1, and preferably from 3/7 to 7/3.

The polystyrene equivalent weight average molecular weight of the component (A-1), as determined by GPC, is typically greater than 2000, and preferably within a range from 3000 to 30,000, and even more preferably from 5000 to 20,000.

The component (A-1) can be produced by polymerization of the monomers that provide the various structural units, using known methods.

<Component (A-2)>

There are no particular restrictions on the component (A-2), provided it has a molecular weight within a range from 500 to 2000, contains a phenolic hydroxyl group, and also contains an acid dissociable, dissolution inhibiting group such as the groups X and X' described above in relation to the component (A-1).

Specific examples of the component (A-2) include compounds with a plurality of phenol structures in which a portion of the hydroxyl group hydrogen atoms have been substituted with an aforementioned acid dissociable, dissolution inhibiting group X or X'.

Examples of the component (A-2) include low molecular weight phenol compounds in which a portion of the hydroxyl group hydrogen atoms have been substituted with an aforementioned acid dissociable, dissolution inhibiting group. These types of compounds are known as sensitizers or heat resistance improvement agents for use in non-chemically amplified g-line or i-line resists.

Examples of these low molecular weight phenol compounds include those compounds listed below.

Examples include bis(4-hydroxyphenyl)methane, bis(2,3,4-trihydroxyphenyl)methane, 2-(4-hydroxyphenyl)-2-(4'-hydroxyphenyl)propane, 2-(2,3,4-trihydroxyphenyl)-2-(2',3',4'-trihydroxyphenyl)propane, tris(4-hydroxyphenyl)methane, bis(4-hydroxy-3,5-dimethylphenyl)-2-hydroxyphenylmethane, bis(4-hydroxy-2,5-dimethylphenyl)-2-hydroxyphenylmethane, bis(4-hydroxy-3,5-dimethylphenyl)-3,4-dihydroxyphenylmethane, bis(4-hydroxy-2,5-dimethylphenyl)-3,4-dihydroxyphenylmethane, bis(4-hydroxy-3-methylphenyl)-3,4-dihydroxyphenylmethane, bis(3-cyclohexyl-4-hydroxy-6-methylphenyl)-4-hydroxyphenylmethane, bis(3-cyclohexyl-4-hydroxy-6-methylphenyl)-3,4-dihydroxyphenylmethane, 1-[1-(4-hydroxyphenyl)isopropyl]-4-[1,1-bis(4-hydroxyphenyl)ethyl]benzene, and dimers, trimers and tetramers of formalin condensation products of phenols such as phenol, m-cresol, p-cresol and xylenol. Of course this is not a restrictive list.

Similarly, there are no particular restrictions on the acid dissociable, dissolution inhibiting group, and groups similar to those described above can be used.

<Acid Generator (B)>

The component (B) can be appropriately selected from known materials used as acid generators in conventional chemically amplified resists.

Specific examples of suitable diazomethane based acid generators include bis(isopropylsulfonyl)diazomethane, bis(p-toluenesulfonyl)diazomethane, bis(1,1-dimethylethylsulfonyl)diazomethane, bis(cyclohexylsulfonyl)diazomethane, and bis(2,4-dimethylphenylsulfonyl)diazomethane.

Specific examples of suitable onium salts include diphenyliodonium trifluoromethanesulfonate, (4-methoxyphenyl)phenyliodonium trifluoromethanesulfonate, bis(p-tert-butylphenyl)iodonium trifluoromethanesulfonate, triphenylsulfonium trifluoromethanesulfonate, (4-methoxyphenyl)diphenylsulfonium trifluoromethanesulfonate, (4-methylphenyl)diphenylsulfonium nonafluorobutanesulfonate, (p-tert-butylphenyl)diphenylsulfonium trifluoromethanesulfonate, diphenyliodonium nonafluorobutanesulfonate, bis(p-tert-butylphenyl)iodonium nonafluorobutanesulfonate and triphenylsulfonium nonafluorobutanesulfonate. Of these, onium salts with a fluorinated alkylsulfonate ion as the anion are preferred.

Specific examples of suitable oxime sulfonate compounds include α-(methylsulfonyloxyimino)-phenylacetonitrile, α-(methylsulfonyloxyimino)-p-methoxyphenylacetonitrile, α-(trifluoromethylsulfonyloxyimino)-phenylacetonitrile, α-(trifluoromethylsulfonyloxyimino)-p-methoxyphenylacetonitrile, α-(ethylsulfonyloxyimino)-p-methoxyphenylacetonitrile, α-(propylsulfonyloxyimino)-p-methylphenylacetonitrile, and α-(methylsulfonyloxyimino)-p-bromophenylacetonitrile. Of these, α-(methylsulfonyloxyimino)-p-methoxyphenylacetonitrile is preferred.

The component (B) may utilize a single acid generator compound, or a combination of two or more compounds.

The quantity of the component (B) is typically within a range from 1 to 20 parts by weight, and preferably from 2 to 10 parts by weight, per 100 parts by weight of the component (A-1) and/or the component (A-2). If the quantity is less than the above range, then pattern formation is inadequate, whereas if the quantity exceeds the above range, then achieving a uniform solution becomes difficult, and the storage stability may also deteriorate.

In order to improve the template pattern shape and the long term stability (post exposure stability of the latent image formed by the pattern wise exposure of the resist layer), a nitrogen containing organic compound may also be added, as an optional component (C), to a metal oxide nanomaterial forming composition of the present invention.

Many compounds have already been proposed for this nitrogen containing organic compound, and any suitable known compound may be selected, although an amine, and in particular a secondary lower aliphatic amine or a tertiary lower aliphatic amine, is preferred.

Here, a lower aliphatic amine refers to an alkyl or alkyl alcohol amine of no more than 5 carbon atoms, and examples of these secondary and tertiary amines include trimethylamine, diethylamine, triethylamine, di-n-propylamine, tri-n-propylamine, tripentylamine, diethanolamine and triethanolamine, and tertiary alkanolamines such as triethanolamine are particularly preferred.

These may be used singularly, or in combinations of two or more different compounds.

This amine is typically added in a quantity within a range from 0.01 to 5.0 parts by weight per 100 parts by weight of the component (A-1) and/or the component (A-2).

Furthermore, in line with the objectives of preventing any deterioration in sensitivity by adding the component (C), and improving the template pattern shape and the long term stability, an organic carboxylic acid, or a phosphorus oxo acid or derivative thereof can also be added as an optional component (D). Either one, or both of the component (C) and the component (D) can be used.

Examples of suitable organic carboxylic acids include malonic acid, citric acid, malic acid, succinic acid, benzoic acid, and salicylic acid.

Examples of suitable phosphorus oxo acids or derivatives thereof include phosphoric acid or derivatives thereof such as esters, including phosphoric acid, di-n-butyl phosphate and diphenyl phosphate; phosphonic acid or derivatives thereof such as esters, including phosphonic acid, dimethyl phosphonate, di-n-butyl phosphonate, phenylphosphonic acid, diphenyl phosphonate and dibenzyl phosphonate; and phosphinic acid or derivatives thereof such as esters, including phosphinic acid and phenylphosphinic acid, and of these, phosphonic acid is particularly preferred.

The component (D) is typically used in a quantity within a range from 0.01 to 5.0 parts by weight per 100 parts by weight of the component (A-1) and/or the component (A-2).

Miscible additives can also be added to a metal oxide nanomaterial forming composition of the present invention according to need, including additive resins for improving the properties of the applied film of the metal oxide nanomaterial forming composition, surfactants for improving the ease of application, dissolution inhibitors, plasticizers, stabilizers, colorants and halation prevention agents.

<Organic Solvent>

A metal oxide nanomaterial forming composition of the present invention can be prepared by dissolving each of the components in an organic solvent.

There are no particular restrictions on the organic solvent used, provided it is capable of dissolving the components to generate a uniform solution, and either one, or two or more conventional resist composition solvents can be used.

Specific examples of suitable solvents include γ-butyrolactone; ketones such as acetone, methyl ethyl ketone, cyclohexanone, methyl isoamyl ketone and 2-heptanone; polyhydric alcohols and derivatives thereof such as ethylene glycol, ethylene glycol monoacetate, diethylene glycol, diethylene glycol monoacetate, propylene glycol, propylene glycol monoacetate, propylene glycol monomethyl ether acetate (PGMEA), dipropylene glycol, or the monomethyl ether, monoethyl ether, monopropyl ether, monobutyl ether or monophenyl ether of dipropylene glycol monoacetate; cyclic ethers such as dioxane; and esters such as methyl lactate, ethyl lactate, methyl acetate, ethyl acetate, butyl acetate, methyl pyruvate, ethyl pyruvate, methyl methoxypropionate, and ethyl ethoxypropionate. These organic solvents can be used singularly, or as a mixed solvent of two or more different solvents.

There are no particular restrictions on the quantity of solvent used, and a quantity that produces a suitable concentration for application to the solid substrate is used. The embodiments of the metal oxide nanomaterial forming composition described above included a radiation sensitive composition comprising (A-1) a high molecular weight compound containing an acid dissociable, dissolution inhibiting group, and (B) an acid generator, as well as a radiation sensitive composition comprising (A-2) a low molecular weight compound containing an acid dissociable, dissolution inhibiting group, and (B) an acid generator, and although these embodiments are preferred, other known radiation sensitive compositions comprising a compound containing a phenolic hydroxyl group can also be favorably applied.

For example, a non-chemically amplified radiation sensitive composition comprising a novolak resin, an alkali soluble resin such as a hydroxystyrene resin, and a photosensitive component such as a compound containing a naphthoquinone diazide group can also be used as the metal oxide nanomaterial forming composition. Furthermore, a sensitizer may also be added to the composition where necessary, and if a low molecular weight compound containing a phenolic hydroxyl group and with a molecular weight of at least 500 is used as the sensitizer, then this sensitizer compound can also function as one of the essential components of the metal oxide nanomaterial forming composition according to the present invention.

[Template]

The film thickness of the template formed on top of the solid substrate is appropriately selected in accordance with the shape and size of the targeted nanomaterial. There are no particular restrictions on this film thickness, although it is typically set to a value within a range from several dozen nm to several μm, and is preferably from 100 to 500 nm.

The pattern width within the template can be appropriately selected in accordance with factors such as the shape of the template being prepared, the resist material being used, the wavelength of the light being irradiated, the width to height aspect ratio, and the distance between adjacent patterns. Specifically, the pattern width within the template is typically set to a value within a range from several dozen nm to several μm.

<Method of Forming Template>

There are no particular restrictions on the method of forming the template, although formation by a lithography method using a radiation sensitive composition as the metal oxide nanomaterial forming composition is preferred. There are no particular restrictions on the specific lithography method employed, and any known lithography method is suitable. Examples of particularly suitable methods include photolithography, X-ray lithography and electron beam lithography.

In those cases where a metal oxide nanomaterial forming composition of an embodiment described above is used to form a template by a lithography process, the following steps are performed.

Namely, first the metal oxide nanomaterial forming composition is applied to the surface of a solid substrate using a spinner or the like, and a prebake is then conducted under temperature conditions of 80 to 150° C., and preferably from 90 to 150° C., for a period of 40 to 120 seconds, and preferably for 60 to 90 seconds. Following selective exposure of the applied film, either through a desired mask pattern or by drawing, PEB (post exposure baking) is conducted under temperature conditions of 80 to 150° C. for a period of 40 to 120 seconds, and preferably for 60 to 90 seconds. Subsequently, developing is conducted using an alkali developing liquid such as an aqueous solution of tetramethylammonium hydroxide with a concentration of 0.1 to 10% by weight. In this manner, a template pattern that is faithful to the mask pattern can be obtained.

An organic or inorganic anti-reflective film may also be provided between the substrate and the applied layer of the metal oxide nanomaterial forming composition.

There are no particular restrictions on the wavelength of the radiation used when forming the template pattern by lithography, and this wavelength can be selected in accordance with the metal oxide nanomaterial forming composition being used.

Specifically, the wavelength differs depending on factors such as the light absorbance of the applied metal oxide nanomaterial forming composition, the film thickness of the metal oxide nanomaterial forming composition, and the size of the template structure being formed, and although there are no particular restrictions, the wavelength is typically selected within a range from the far ultraviolet radiation region with wavelengths of less than 300 nm, through to the extreme ultraviolet and X-ray region with wavelengths in the order of several nm. Suitable examples include KrF, ArF, electron beams, EUV (Extreme Ultraviolet: wavelength of approximately 13.5 nm), and X-rays. In the case of a radiation sensitive composition comprising the aforementioned component (A-1) or (A-2), together with the acid generator of the component (B), any one of KrF, ArF, an electron beam, EUV, or X-rays can be used to generate a suitable fine template. In the case of radiation sensitive compositions other than the chemically amplified compositions described above, electron beams are preferred, as they enable the formation of fine patterns of no more than 200 nm.

Furthermore, the process conditions employed when forming the template pattern by a lithography method are not restricted to those described above, and may be set appropriately in accordance with the actual composition of the metal oxide nanomaterial forming composition.

The method of forming the template is not restricted to microprocessing techniques such as patterning by lithography. For example, a fine structure formed by preparing a microprocessed substrate in advance, and then pressing another substrate against this prepared substrate in order to transfer the fine pattern can also be used. This particular method can be used for both metal oxide nanomaterial forming compositions that display radiation sensitivity and those that do not display such radiation sensitivity.

A template formed using a metal oxide nanomaterial forming composition of the present invention comprises phenolic hydroxyl groups originating from the metal oxide nanomaterial forming composition on the surface of the template, although additional reactive groups may also be introduced at the template surface. Hydroxyl groups and/or carboxyl groups are preferred as these reactive groups. Introduction of these reactive groups at the template surface can employ known methods for introducing reactive groups (such as known methods used for introducing hydroxyl groups or carboxyl groups). For example, by adsorbing mercaptoethanol onto the template surface, hydroxyl groups can be introduced. In the present invention, this step for introducing additional hydroxyl groups and/or carboxyl groups onto the template surface can be omitted, enabling a nanostructure or nanomaterial to be prepared by a fewer number of steps.

The quantity of reactive groups (at least the phenolic hydroxyl groups derived from the metal oxide nanomaterial forming composition) on the template surface per unit area of the template has a significant effect on the density of the metal oxide layer that is subsequently formed on top of the template. Hence, in order to enable formation of a favorable metal oxide layer, the above quantity of reactive groups must be within a range from $5.0 \times 10^{13}$ to $1.0 \times 10^{15}$ equivalents/cm$^2$, and preferably from $1.0 \times 10^{14}$ to $5.0 \times 10^{14}$ equivalents/cm$^2$.

A template formed using a metal oxide nanomaterial forming composition of the present invention is ideally suited to subsequent template removal using oxygen plasma treatment, ozone oxidation treatment or calcination treatment.

<Metal Oxide Layer>

In a production method of the present invention, a metal oxide layer is formed on top of the template.

Furthermore, prior to the formation of the metal oxide layer on the template, the template surface may be activated by a treatment such as oxygen plasma treatment or ozone oxidation. This activation treatment is not an absolute necessity, but is preferred, as performing such activation enables the production of a metal oxide nanostructure in which the shape of the template has been more accurately reproduced or transferred. Oxygen plasma treatment is the preferred method for such activation treatment.

The formation of the metal oxide layer can be conducted using a sol-gel method. In other words, first a step (a) is conducted in which a material containing a metal compound with a functional group that undergoes a condensation reaction with a hydroxyl group, and a functional group that can generate a hydroxyl group through hydrolysis, is brought in contact with the template surface.

The material containing a metal compound typically employs a solution containing the metal compound. There are no particular restrictions on the method used for bringing the solution into contact with the template, and suitable methods include those where the solid substrate with the template formed thereon is immersed in the solution containing the metal compound (dip coating), methods in which the solution is layered onto the template using spin coating, as well as other methods such as alternate adsorption.

When the solution containing the metal compound is brought into contact with the template, the metal compound undergoes a condensation reaction with the reactive groups (at least the phenolic hydroxyl groups derived from the metal oxide nanomaterial forming composition) on the surface of the template. This condensation reaction causes a strong chemical adsorption of the metal compound to the reactive groups on the template surface.

In this description, the term "chemical adsorption" describes the formation of a chemical bond (such as a covalent bond, a hydrogen bond or a coordinate bond) or an electrostatic bond (such as an ionic bond) between the reactive groups (at least the phenolic hydroxyl groups derived from the metal oxide nanomaterial forming composition) on the template, and the metal compound or metal ions, thus resulting in a state in which the metal compound or metal ions or the like are bonded to the template surface.

The contact time between the material containing the metal compound and the template, and the contact temperature, vary depending on the activity of the metal compound being used, and although there are no particular restrictions, typically the contact is conducted for a period of 1 minute to several hours at a temperature within a range from 0 to 100° C. The time required for this contact process can be shortened markedly by using a catalyst such as an acid or a base that promotes the reaction between the metal compound and the reactive groups on the template surface.

After the aforementioned step (a), the template surface is coated not only with a saturated chemical adsorption quantity of the metal compound, but also with a quantity of physically adsorbed metal compound. In some cases, it may be preferable to remove this excess metal compound that is physically adsorbed to the template surface in order to achieve a uniform, homogenous layer of the metal compound. If this excess metal compound is removed from the template surface, then the metal oxide layer is formed solely from the saturated quantity of the metal compound that is chemically adsorbed to the template surface, and consequently the metal oxide layer can be formed with excellent precision and superior reproducibility based on this saturated quantity of the metal compound.

Accordingly, where required, the template surface can be washed following the step (a) described above, thus washing off and removing only the physically adsorbed compound.

There are no particular restrictions on the method used for removing the excess metal compound, provided it selectively removes only the physically adsorbed compound. For example, an ideal method involves washing the template using the same organic solvent that was used in the preparation of the material containing the metal compound. The washing can employ any of a variety of methods including methods in which the organic solvent is suctioned up under reduced pressure, methods in which the template is immersed in the organic solvent, spray washing methods, and steam cleaning methods. Furthermore, the washing temperature is preferably the same temperature as that used during the step for adsorbing the metal compound.

Furthermore, if spin coating or the like is used as the method for bringing the solution containing the metal compound into contact with the template, then because the thickness of the adsorbed layer can be controlled at a constant level at all times, any physically adsorbed material can be removed without having to perform a separate washing step.

The metal compound used in the formation of the metal oxide layer contains a functional group that undergoes a condensation reaction with a hydroxyl group, and a functional group that generates a hydroxyl group on hydrolysis. The functional group that undergoes a condensation reaction with a hydroxyl group, and the functional group that generates a hydroxyl group on hydrolysis may be either the same functional group, or different functional groups.

Specific examples of the metal compound include metal alkoxide compounds such as titanium butoxide (Ti(O-nBu)$_4$), zirconium propoxide (Zr(O-nPr)$_4$), aluminum butoxide (Al(O-nBu)$_3$), niobium butoxide (Nb(O-nBu)$_5$), silicon tetramethoxide (Si(O-Me)$_4$) and boron ethoxide (B(O-Et)$_3$); metal alkoxides containing at least two alkoxyl groups such as methyltrimethoxysilane (MeSi(O-Me)$_3$) and diethyldiethoxysilane (Et$_2$Si(O-Et)$_2$); metal alkoxides containing a ligand such as acetylacetone as well as at least two alkoxyl groups; metal alkoxides of rare earth metals such as lanthanide isopropoxide (Ln(O-iPr)$_3$) and yttrium isopropoxide (Y(O-iPr)$_3$); and double alkoxide compounds such as BaTi(OR)$_x$.

Furthermore, in addition to the metal alkoxides listed above, fine particles of alkoxide sols or alkoxide gels obtained by adding a small quantity of water to an aforementioned metal alkoxide to effect a partial hydrolysis and condensation, dimers or cluster type alkoxide compounds containing either a multiple of one metal element or a plurality of different metal elements, such as titanium butoxide tetramer (C$_4$H$_9$O[Ti(OC$_4$H$_9$)$_2$O]$_4$C$_4$H$_9$), and polymers based on metal alkoxides with one dimensional cross linking via an oxygen atom can also be used as the compound containing a metal alkoxide group according to the present invention.

In addition, metal complexes which adsorb to the reactive groups on the template surface and on hydrolysis generate new hydroxyl groups on the surface can also be used as the metal compound of the present invention. Specific examples of such metal complexes include metal halides such as cobalt chloride (COCl$_2$), titanium oxoacetylacetate (TiO(CH$_3$COCH$_2$COO)$_2$) and metal carbonyl compounds such as iron pentacarbonyl (Fe(CO)$_5$), as well as polynuclear clusters of the above compounds.

The above metal compound may also comprise a combination of two or more metal compounds If necessary. By combining two or more different metal compounds, a thin film of a composite metal compound can be formed on the surface of the template.

There are no particular restrictions on the solvent used for dissolving the above metal compound. Examples of suitable solvents include methanol, ethanol, propanol, hexane, heptane, toluene and benzene, and these solvents can be used singularly, or in mixtures of two or more solvents. The concentration of the solution containing the dissolved metal compound is preferably within a range from 1 to 100 mM (millimols).

Following completion of the step (a) described above, and subsequent removal of any excess metal compound, a step (b) is conducted in which the metal compound adsorbed to the template surface is hydrolyzed to form the metal oxide layer.

As a result of this hydrolysis, the metal compound molecules on the surface of the template are hydrolyzed, and undergo a mutual condensation to form a metal oxide layer, while new hydroxyl groups are formed simultaneously on the metal oxide layer surface. In some cases, the metal atoms of the metal compound may undergo air oxidation at the same time as the hydrolysis, forming a metal oxide.

The hydrolysis can employ known methods, and there are no particular restrictions on the method used. For example, bringing the template with the adsorbed metal compound into contact with water is the most commonly used method. In order to prevent the incorporation of impurities and ensure the generation of a high purity metal oxide, ion exchange water is preferably used in this hydrolysis step. Furthermore, by also using a catalyst such as an acid or a base during the hydrolysis, the time required for this step can be shortened markedly.

Hydrolysis can also be conducted by immersing the template with the adsorbed metal compound into an organic solvent containing a small quantity of water. Moreover, in those cases where the metal compound displays a high level of reactivity with water, the metal compound can also be reacted with the water vapor in the air in order to effect the hydrolysis.

Specifically, the layer containing the metal compound is preferably either immersed in water at a suitable temperature for a suitable period of time, or exposed to air that contains a certain level of water vapor.

Following completion of this hydrolysis step, if required, the template surface may be dried under a stream of a drying gas such as nitrogen gas. Such drying enables the production of a more uniform metal oxide layer.

Subsequently, because the aforementioned hydrolysis process also forms new reactive groups on the surface of the metal oxide layer, these new reactive groups can be used to repeat the process and form a new metal oxide layer on the surface.

In other words, a step (a') is conducted for bringing a material comprising a metal compound with a functional group that undergoes a condensation reaction with a hydroxyl group, and a functional group that generates a hydroxyl group through hydrolysis, into contact with the surface of the metal oxide layer formed on the template, and the aforementioned step (b) is then repeated.

By alternating the step (a') and the step (b), layers of metal oxide are accumulated and the film thickness is increased.

By repeating the combined operation comprising the step (a) or the step (a') followed by the step (b) at least once, and preferably at least 10 times, and even more preferably 20 times or more, a uniform metal oxide layer of the desired thickness can be formed on top of the template. In other words, the thickness of the metal oxide layer can be controlled by the number of repetitions of the steps for bringing the metal compound in contact with the surface, and then conducting hydrolysis.

By repeating the above operation, a thin metal oxide layer with a thickness within a range from several nanometers to several dozen nanometers can be formed with good precision. In the case where a metal alkoxide such as titanium butoxide containing one type of metal atom is used, by adjusting the contact conditions, thin metal oxide films with a thickness of several angstroms can be layered sequentially on top of one another. In such a case, increasing the film thickness for a single cycle requires an increase in the number of repetitions of metal alkoxide layering. In contrast, if fine particles of an alkoxide gel or the like are used, then thin films with a thickness of approximately 60 nm can be layered onto the surface in a single cycle. Furthermore if spin coating is used for forming the metal oxide layer, then the film thickness can be controlled and adjusted to any value within a range from several nm to approximately 200 nm by adjusting factors such as the solvent used, the concentration of the metal compound solution, and the spin speed. Moreover, if the type of metal compound used is varied, then a laminate comprising a plurality of different metal oxide layers can also be produced.

Formation of the metal oxide layer can also be conducted using methods other than the sol-gel method described above, but sol-gel methods enable control of the structure of the metal oxide nanostructure down to the molecular level, and are consequently preferred.

Furthermore, in the sol-gel method described above, a material (solution) containing the metal compound and an organic compound may also be used as the material (solution) containing the metal compound. In those cases where a material (solution) containing both a metal compound and an organic compound is used, a nanometer level composite thin film comprising both the metal compound and the organic compound (hereafter described as an organic/metal oxide composite layer) is formed. The metal oxide layer of the present invention includes these types of organic/metal oxide composite layer.

The aforementioned organic/metal oxide composite layer may adopt a number of configurations, including (1) a configuration comprising portions in which the organic compound is dispersed within the metal oxide, (2) a configuration comprising portions in which the metal oxide and the organic compound form a layer like structure in the thickness direction, and (3) a configuration comprising portions in which the organic compound is dispersed within the metal oxide, and portions in which the metal oxide and the organic compound form a layer like structure in the thickness direction.

There are no particular restrictions on the organic compound included within the material containing the metal compound, provided the organic compound is soluble with the metal compound in the solvent being used.

The term "soluble" here includes not only organic compounds that are themselves soluble in the solvent, but also compounds such as 4-phenylazobenzoic acid which becomes soluble in chloroform by complexing with the metal alkoxide. There are also no particular restrictions on the molecular weight of the organic compound.

Examples of suitable organic compounds include those listed below.

Examples include polyvinylphenol and polyvinylphenol based organic polymer compounds that are insoluble in water but readily soluble in ethanol; acetone soluble compounds such as polymethylmethacrylate, vinyl polyacetate and hydroxypropylmethylcellulose phthalate; and polystyrenes that are soluble in chloroform or the like.

Furthermore, cationic polymer compounds such as PDDA (polydimethyldiallylammonium chloride), polyethyleneimine, polylysine, chitosan and dendrimers with amino groups at the terminals can also be used. Because the metal alkoxide and the metal oxide can form an anionic interaction with the cation of such cationic polymer compounds, a powerful bonding can be achieved.

Furthermore, organic polymer compounds which cause the generation of hydroxyl groups or carboxyl groups in the resulting organic/metal oxide composite layer such as polyvinyl alcohol, polyvinylphenol, polyacrylic acid, polymethacrylic acid and poly(2-hydroxyethyl methacrylate), or polyglutamic acid, polyserine, amylose and colominic acid can also be used.

Of the above compounds, from the viewpoint of ensuring a powerful contact between the metal oxide layer and the template, compounds that comprise a plurality of reactive groups (preferably hydroxyl groups or carboxyl groups) and are also solid at room temperature (25° C.) are preferred. Specific examples of preferred organic compounds that satisfy these requirements include polymer compounds containing hydroxyl groups or carboxyl groups such as polyacrylic acid, polyvinyl alcohol, polyvinylphenol, polymethacrylic acid and polyglutamic acid; polysaccharides such as starch, glycogen and colominic acid; disaccharides or monosaccharides such as glucose and mannose; and porphyrin compounds or dendrimers with a hydroxyl group or carboxyl group at the terminals.

These organic compounds may function not only as a structural component for forming a thin film of superior mechanical strength, but may also perform other important functions such as acting as a functional site that imparts specific functionality to the product nanomaterial, or acting as a temporary component which is removed following formation of the metal oxide layer, thus generating voids within the nanostructure that match the molecular shape of the organic compound.

<Removal of the Template>

In the production method of the present invention, following formation of the template and the metal oxide layer, in that order, on top of the solid substrate, the template is removed to yield a metal oxide nanostructure. The solid substrate may either be removed or left as a part of the metal oxide nanostructure. Specifically, the following configurations are possible: (1) a configuration in which only the template is removed, yielding a metal oxide nanostructure comprising both the metal oxide layer and the solid substrate, (2) a configuration in which following removal of the template, the solid substrate is also removed, yielding a metal oxide nanostructure formed from the metal oxide layer, (3) a configuration in which following removal of the solid substrate, the template is also removed, yielding a metal oxide nanostructure formed from the metal oxide layer, and (4) a configuration in which at the time of template removal, the template and the solid substrate are removed simultaneously, that is, an integrated body containing both the template and the solid substrate is removed, yielding a metal oxide nanostructure formed from the metal oxide layer.

There are no particular restrictions on the method used for removing the template, although in terms of ease of controllability, a treatment method selected from a group consisting of plasma treatment, ozone oxidation, elution and calcination is preferred, and plasma treatment is particularly desirable.

Similarly, there are no particular restrictions on the method used for removing the solid substrate, and any of a variety of separation methods such as ultrasound treatment, scratching or washing can be used to separate the solid substrate, either from the metal oxide layer in the case of (2) above, or from the metal oxide layer and the template in the case of (3) above.

In the configuration (4) above, any of a variety of separation methods such as ultrasound treatment, scratching or washing can be used as the method of removing the template and the solid substrate simultaneously, so that an integrated body containing both the template and the solid substrate is removed. In this case, the isolated integrated body containing both the template and the solid substrate can be reused in the production of nanomaterials.

In those cases where an organic/metal oxide composite layer is formed on the template as the metal oxide layer, either a portion of, or all of, the organic compound within the organic/metal oxide composite layer may be removed at the same time as the template removal.

Furthermore if necessary, a separate step to the template removal step can be provided for removing the organic compound within the organic/metal oxide composite layer. For example, a separate plasma treatment, ozone oxidation, elution or calcination step may be provided, with different conditions to those employed in the template removal step.

If either a portion of, or all of, the organic compound within the organic/metal oxide composite layer is removed, then a structure is formed with voids that correspond with the shape of the organic compound. In other words, an amorphous metal oxide layer with vacancies that match the molecular shape of the removed organic compound is formed.

Specific examples of the product structure include (a) structures in which the portions corresponding with the organic compound that was incorporated within the organic/metal oxide composite layer are simply converted to voids, (b) structures in which the portions corresponding with the organic compound that was incorporated within the organic/metal oxide composite layer function as the center of voids which extend into the immediate vicinity, and (c) structures in which the portions corresponding with the organic compound that was incorporated within the organic/metal oxide composite layer are either simply converted to voids, or function as the center of voids which extend into the immediate vicinity, and a portion of these voids are then interconnected to form a network type structure.

These types of metal oxide layers which incorporate voids can be used as selective permeation membranes that are specific to certain molecular structures.

The treatment method used for removing the template and the associated treatment conditions can be determined appropriately in accordance with factors such as the template composition, and the nature of the organic compound to be removed at the same time as the template. For example, the time length of the plasma treatment, and the pressure, output and temperature during the treatment can be determined in accordance with the nature and size of the component being removed, and the plasma source itself. The plasma treatment can utilize a variety of different gases including oxygen gas, hydrogen gas and nitrogen gas.

In the case of oxygen plasma treatment, the pressure during the plasma treatment is typically within a range from 1.33 to 66.5 Pa (10 to 500 mTorr), and preferably from 13.3 to 26.6 Pa (100 to 200 mTorr). Furthermore, the plasma output during the oxygen plasma treatment is typically within a range from 5 to 500 W, and preferably from 10 to 50 W. The treatment time for an oxygen plasma treatment is typically within a range from 5 minutes to several hours, and preferably from 5 to 60 minutes. Furthermore, the temperature during the plasma treatment is typically a low temperature, and preferably within a range from −30 to 300° C., and even more preferably from 0 to 100° C., and most preferably room temperature (5 to 40° C.). There are no particular restrictions on the apparatus used in the oxygen plasma treatment, and one suitable example is the Plasma Etcher PE-2000, manufactured by South Bay Technology, USA.

The conditions employed in the case of ozone oxidation treatment can be determined appropriately in accordance with factors such as the nature of the template or organic compound contained within the organic/metal oxide composite layer that is to be removed, and the apparatus being used. For example, the pressure during the ozone oxidation treatment is typically within a range from atmospheric pressure to 13.3 Pa (100 mTorr), and preferably from 133.3 to 13333.3 Pa (1 to 100 Torr). Furthermore, the treatment time for an ozone oxidation treatment is typically within a range from several minutes to several hours, and preferably from 5 to 60 minutes. The treatment temperature is typically within a range from room temperature to 600° C., and preferably from room temperature to 400° C.

In the case of elution, an appropriate conventional elution method can be employed in accordance with the nature of the template or the component contained within the organic/metal oxide composite layer that is to be removed. For example, a metal oxide nanomaterial forming composition used in the formation of a template according to the present invention can be selectively eluted out using a polar solvent such as acetone or ethanol. Similarly, polystyrene can be selectively eluted out using a solvent such as chloroform or toluene.

Preferred treatment conditions in the case of calcination treatment include a temperature of 100 to 1000° C., and preferably from 300 to 500° C., under normal atmospheric conditions, and a treatment time of 30 seconds to several hours, and preferably from 1 to 60 minutes. Furthermore, in those cases where a solid substrate such as a Si wafer that is prone to oxidation is used, the calcination treatment is preferably conducted in a nitrogen atmosphere in order to prevent oxidation of the solid substrate. The other conditions relating to calcination treatment in a nitrogen atmosphere are the same as those for normal atmospheric conditions.

In the present invention, at least a portion of the metal oxide nanostructure obtained in the manner described above can be coated with an organic compound layer.

By coating the nanostructure with this type of organic compound layer, the organic compound layer can function as a backing material for the metal oxide nanostructure, thus improving the durability and the elasticity and the like of the metal oxide nanostructure.

This organic compound layer is formed using an organic compound solution. There are no particular restrictions on the organic compound and the solvent used, and similar organic compounds and solvents to those used in the formation of the aforementioned organic/metal oxide composite layer can be used.

Furthermore, there are no particular restrictions on the portion that is coated with the organic compound, and the back surface of the metal oxide nanostructure is one suitable option.

The thickness of the organic compound layer of this coating is typically within a range from 10 nm to 10 μm, and preferably from 100 to 500 nm.

In those cases where the metal oxide nanostructure still contains the solid substrate, there are no particular restrictions on the thickness of the solid substrate, which will vary depending on the type of solid substrate used, although thickness values within a range from 0.1 to approximately 3 mm are preferred, and thickness values from 0.5 to 1 mm are even more desirable. Furthermore, the film thickness of the metal oxide layer or the organic/metal oxide composite layer varies depending on the number of times the layer forming operation is repeated, although typically the film thickness is within a range from 1 to 100 nm, and preferably from 10 to 20 nm. The shape of the metal oxide layer or the organic/metal oxide composite layer is reproduced or transferred from the template, and may be any of a variety of shapes including rectangle-shaped lines, straight lines, cylindrical shapes or thread-like shapes. In the case of a rectangular line structure, the width of each line is typically within a range from several dozen nm to several μm, and preferably from 300 to 500 nm, and the height of each line is typically within a range from 1 nm to 1 μm, and preferably from 100 to 500 nm.

The metal oxide nanostructure is a three dimensional structure with a shape that has been reproduced or transferred from the template, and is self-supporting. Here, the term "self-supporting" is not restricted to those cases where following removal of the solid substrate, the metal oxide nanostructure retains the same three dimensional form as that prior to removal of the solid substrate, but means that following removal of the solid substrate, the metal oxide nanostructure does not undergo an irreversible agglomeration into a mass, but rather retains a considerably large value for the ratio of the surface area of the product metal oxide nanostructure relative to the film thickness.

Nanomaterials of the present invention are materials incorporating a metal oxide nanostructure with a shape that has been reproduced or transferred from a template, and these materials can be applied to ultra thin film sheets and ultra fine metal fibers and the like. Furthermore, in those cases where the metal oxide nanostructure is a composite material, potential applications are wide-ranging, including biofunctional materials incorporating proteins such as enzymes, and a variety of medical materials.

Furthermore, because nanomaterials according to the present invention can be produced as self-supporting materials comprising laminated metal oxide layers or organic/metal oxide composite layers with any of a multitude of shapes displaying nanometer level precision, the nanomaterials themselves can be used in the design of materials with new electrical and electronic characteristics, magnetic characteristics, or optical characteristics. Specifically, the nanomaterials can be used in the production of semiconductor superlattice materials, or in the design of high efficiency photochemical or electrochemical reactions. Furthermore, the production costs associated with nanomaterials of the present invention are markedly lower than other methods, meaning the nanomaterials could provide economically viable, basic technology for light to energy conversion systems such as solar cells or the like.

In addition, in the present invention, during the formation of the metal oxide layer, by varying the lamination ratio of at least two different metal compounds in a stepwise manner, a variety of different functionally graded nanomaterials can be produced. Furthermore, by using a combination of the present invention with any of the variety of recently proposed organic compound sequential adsorption methods, a multitude of different organic-inorganic composite ultra thin films can be designed, enabling the production of ultra thin films with new optical, electronic and chemical functions.

Moreover, nanomaterials containing an amorphous metal oxide layer have a lower density than nanomaterials containing a normal metal oxide layer, meaning they display potential for use as thin film materials with ultra low dielectric constants, and for the production of sensors. In particular, such nanomaterials offer potential as the insulating material for electronic circuits with a patterned circuit or uneven pattern in the 10 to 20 nm size range, or as a masking or coating film for use during ultra fine processing of a solid surface.

Furthermore, because amorphous metal oxide layers contain vacancies with a huge variety of molecular sizes, they can be used in new material syntheses that require catalyst support or ion incorporation. Furthermore, such metal oxide layers can also be used as coating films for a variety of different materials, enabling the chemical, mechanical or optical characteristics of the surface of the material to be altered, and thus suggesting potential applications as photocatalysts or ultra hydrophilic surfaces.

EXAMPLES

As follows is a more detailed description of the specific characteristics of the present invention, based on a series of examples. The materials, quantities, proportions, treatments, and treatment sequences and the like described in the following examples can be modified without departing from the spirit or scope of the present invention. Accordingly, the invention is not to be considered as being limited by the following examples, and is only limited by the scope of the appended claims.

Example 1

A metal oxide nanomaterial forming composition 1 with the composition described below was used to form a template, and produce a nanomaterial.

| | |
|---|---|
| resin 1 | 100 parts by weight |
| resin 2 | 100 parts by weight |
| acid generator 1 | 6.5 parts by weight |
| additive: salicylic acid | 0.227 parts by weight |
| additive: triethanolamine | 0.108 parts by weight |
| additive: DMAc (dimethylacetamide) | 5.42 parts by weight |
| solvent: PGMEA | 730 parts by weight |

In this composition, the resin 1 is a high molecular weight organic compound with a weight average molecular weight of 8000, comprising the structural units shown below in the chemical formula 8, wherein the ratio m/n shown in the formula is 75/25 (units: mol %).

The resin 2 is also a high molecular weight organic compound with a weight average molecular weight of 8000, comprising the structural units shown below in the chemical formula 9, wherein the ratio m/n shown in the formula is 75/25.

Furthermore, the acid generator 1 is the compound shown below in the chemical formula 10.

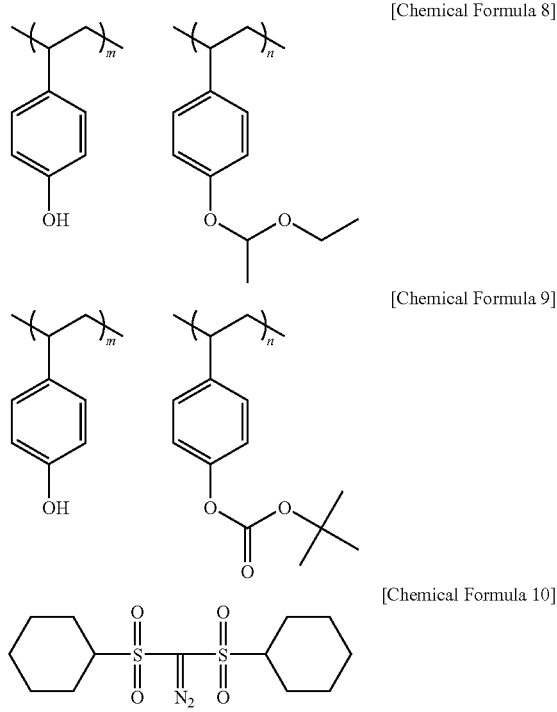

[Chemical Formula 8]

[Chemical Formula 9]

[Chemical Formula 10]

First, the metal oxide nanomaterial forming composition 1 described above was applied to the surface of an 8-inch silicon wafer substrate using spin coating, and prebaking was then conducted for 90 seconds at 90° C., thus forming a film thickness of 500 nm.

This film was exposed using a KrF excimer laser exposure device FPA-3000EX3, manufactured by Canon Inc. (NA 0.6, σ0.65).

Following the completion of post exposure baking (PEB) for 90 seconds at 110° C., the film was developed for 60 seconds in a 2.38% by weight aqueous solution of tetramethylammonium hydroxide, thus forming a line and space pattern, and completing the template.

The pattern shape comprised rectangle-shaped lines with varying widths from 200 nm to 1.5 μm, a length of 5 mm and a height of 400 nm.

The exposure dose at which a 250 nm L&S pattern was produced with a 1:1 ratio between the line width and the distance between lines was 15 mJ/cm².

Oxygen plasma treatment was then performed (10 W, 23.9 Pa (180 mTorr), 10 minutes) in order to activate the surface of the template formed on the substrate in this manner.

Subsequently, the substrate was immersed for 2 minutes in 10 ml of a solution (a 100 mM heptane solution) of titanium normal butoxide (Ti(O-nBu)₄), and was then washed by subsequent immersion for 1 minute in 10 ml of heptane, and then a further 1 minute in 5 ml of heptane. The substrate was then immersed for 1 minute in 5 ml of ion exchange water to hydrolyze the titanium normal butoxide adsorbed to the substrate surface, and then dried under a stream of nitrogen gas.

The combined operation described above of adsorbing the titanium normal butoxide, washing with heptane, performing hydrolysis in ion exchange water, and then drying under nitrogen gas (hereafter this combined operation is referred to as the "titania film lamination operation") was repeated 20 times.

Subsequently, the substrate was subjected to oxygen plasma treatment (30 W, 23.9 Pa (180 mTorr), 2 hours) to remove the template portion.

A scanning electron microscope image of a portion of the thus obtained nanostructure is shown in FIG. 1. As can be seen in FIG. 1, the product nanostructure displayed some contraction, although it is evident that the product was a titania nanotube structure with a film thickness of several dozen nm and a width of 200 nm which had retained the same rectangular structure as the template. Furthermore, because none of the template material can be seen within the titania nanotube structure, it is clear that the metal oxide nanomaterial forming composition was completely removed by the oxygen plasma treatment.

Example 2

A metal oxide nanomaterial forming composition 2 with the composition described below was used to form a template, and produce a nanomaterial.

| | |
|---|---|
| resin 3 | 100 parts by weight |
| acid generator 2 | 2.76 parts by weight |
| acid generator 3 | 0.93 parts by weight |
| additive: phenylphosphonic acid | 0.281 parts by weight |
| additive: triethanolamine | 0.263 parts by weight |
| solvent: ethyl lactate (EL) | 730 parts by weight |

In this composition, the resin 3 is a high molecular weight organic compound with a weight average molecular weight of 10,000, comprising the structural units shown below in the chemical formula II, wherein the ratio l/m/n shown in the formula is 63/24/13 (units: mol %).

The acid generator 2 is the compound shown below in the chemical formula 12, and the acid generator 3 is the compound shown in the chemical formula 13.

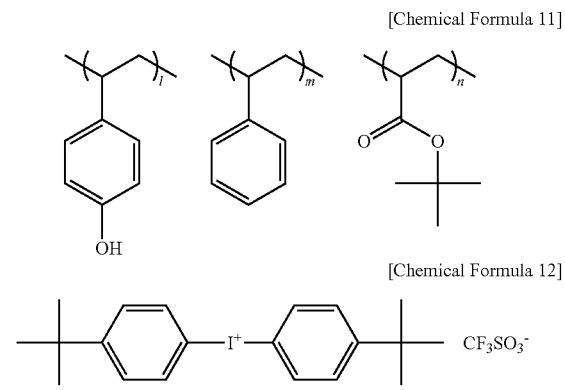

[Chemical Formula 11]

[Chemical Formula 12]

[Chemical Formula 13]

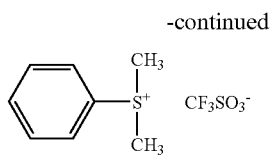

Using this metal oxide nanomaterial forming composition 2, and with the exceptions of altering the prebake conditions and the PEB conditions as described below, a line and space (L&S) pattern was formed in the same manner as the example 1, thus producing a template.

The prebake conditions were set to 90 seconds at 110° C., and the PEB conditions were also set to 90 seconds at 110° C.

The exposure dose at which a 250 nm L&S pattern was produced with a 1:1 ratio was 22 mJ/cm$^2$.

When the thus produced template was used to produce a titania nanotube structure in a similar manner to the example 1, a titania nanotube structure with a width of 200 nm which had retained the same rectangular structure as the template was obtained, and the surface of this tube structure was smooth.

Example 3

Figure 2:
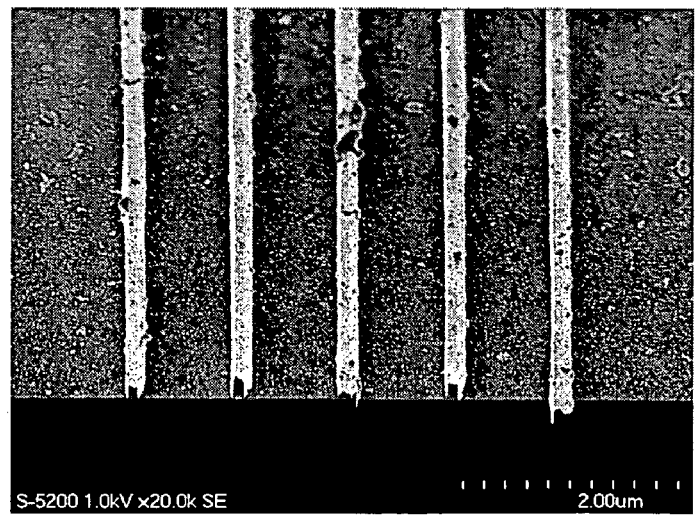
FIG. 2 is a scanning electron microscope image of a titania nanotube material prepared in an example 3.

With the exception of reducing the number of repetitions of the titania film lamination operation described in the example 1 from 20 down to 10, a titania nanotube structure was prepared using the same method as the example 1. A scanning electron microscope image of a portion of the thus obtained nanostructure is shown in FIG. 2. As can be seen in FIG. 2, it is evident that even if the number of repetitions of the titania film lamination operation is reduced to 10, a similar result is achieved to the case of 20 repetitions, in that the product obtained is still a titania nanotube structure that retains the same rectangular structure as the template.

Example 4

Figure 3:
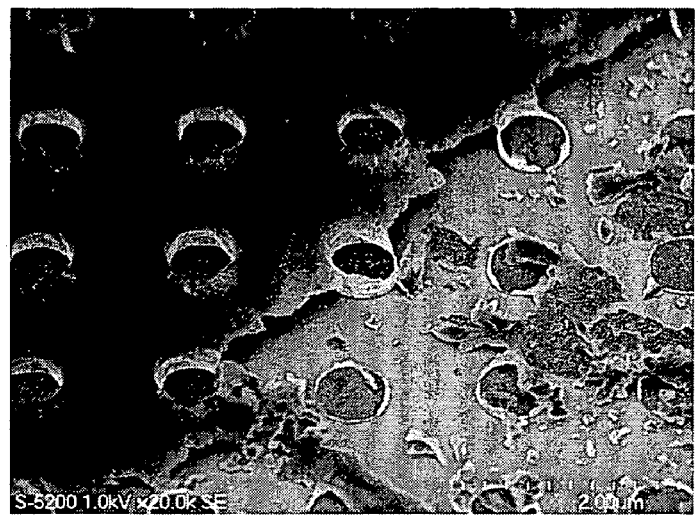
FIG. 3 is a scanning electron microscope image (1 of 2) of a titania nanotube material prepared in an example 4.
Figure 4:
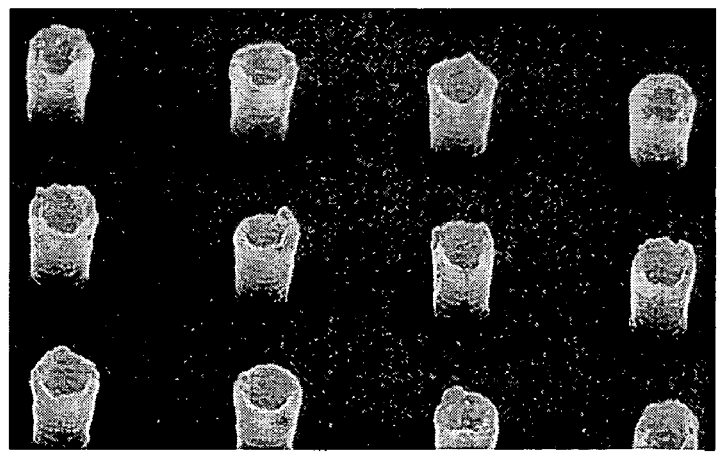
FIG. 4 is a scanning electron microscope image (2 of 2) of the titania nanotube material prepared in the example 4.

With the exception of replacing the template comprising the rectangular line shaped structure described in the example 1 with a template comprising a plurality of circular cylindrical cavities of diameter 300 nm and depth 400 nm, a titania nanotube structure was prepared using the same method as the example 1. Scanning electron microscope images of the product nanostructure are shown in FIG. 3 and FIG. 4. As shown in FIG. 3, a roof-like structure was formed in which the circular cylindrical nanotube structures of diameter 300 nm were interconnected via a thin film with a film thickness of approximately 10 nm (in FIG. 3, a portion of the structure has been destroyed to enable the cross sectional shape to be better appreciated). From this drawing it is evident that the production method of the present invention has enabled the production of a nanostructure that represents a precise reproduction of the shape of the template. FIG. 4 shows a portion of the product titania nanostructure with the roof portion removed. From FIG. 4 it is evident that the cavity portions of the template have also been faithfully reproduced.

Example 5

Using the metal oxide nanomaterial forming composition 1 described above, 20 repetitions of the titania film lamination operation were performed in the same manner as the example 1.

Figure 5:
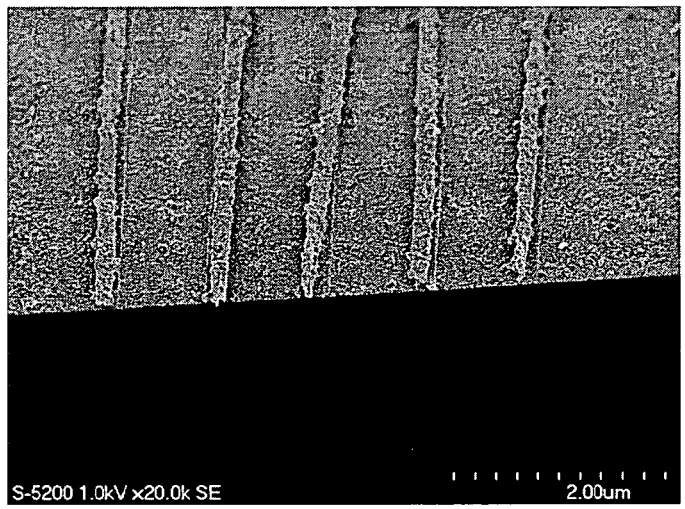
FIG. 5 is a scanning electron microscope image of a titania nanotube material prepared in an example 5.

Subsequently, the substrate was gradually heated to 400° C. over a period of 150 minutes, and then held at 400° C. for 4 hours, before being allowed to cool naturally to room temperature. FIG. 5 shows a scanning electron microscope image of the substrate surface following this calcination treatment. As shown in FIG. 5, removal of the template by calcination yields similar results to those observed when the template was removed by oxygen plasma treatment, with the product titania nanostructure displaying a shape that represents a precise reproduction of the template structure.

Example 6

The titania nanotube structure produced in the example 1 was immersed in 0.5 ml of ethanol, and was then subjected to 10 seconds of ultrasound treatment using a bath sonicator. Subsequently, a 0.1 ml aliquot of the ethanol solution was removed, and then dripped onto a heated silicon substrate at 100° C. to evaporate the ethanol.

Figure 6:
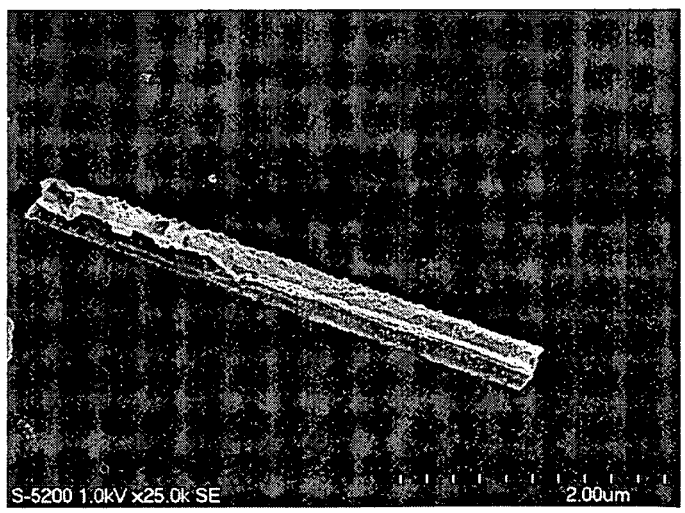
FIG. 6 is a scanning electron microscope image of a titania nanotube material prepared in an example 6.

The surface of this silicon substrate was then inspected under a scanning electron microscope. The resulting scanning electron microscope image is shown in FIG. 6. As shown in FIG. 6, a rectangular nanostructure with a width of approximately 300 nm and a length of approximately 2 μm was observed. Considering that this line width is almost identical with the width of the template, it is evident that the ultrasound treatment has enabled the production of a nanostructure in which the silicon wafer has been removed from the titania nanotube structure produced in the example 1.

Comparative Example 1

A nanomaterial was produced using the composition described below as the material for forming the template.

| | |
|---|---|
| resin 4 | 100 parts by weight |
| acid generator 4 | 2 parts by weight |
| acid generator 5 | 0.8 parts by weight |
| additive: triethanolamine | 0.25 parts by weight |
| additive: γ-butyrolactone | 25 parts by weight |
| solvent 1: PGMEA | 438 parts by weight |
| solvent 2: propylene glycol monomethyl ether (PGME) | 292 parts by weight |

In this composition, the resin 4 is a high molecular weight organic compound with a weight average molecular weight of 10,000, comprising the structural units shown below in the chemical formula 14, wherein the ratio l/m/n shown in the formula is 40/40/20 (units: mol %).

Furthermore, the acid generator 4 is the compound shown below in the chemical formula 15, and the acid generator 5 is the compound shown in the chemical formula 16

[Chemical Formula 14]

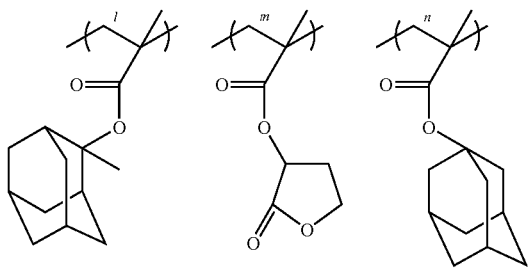

-continued

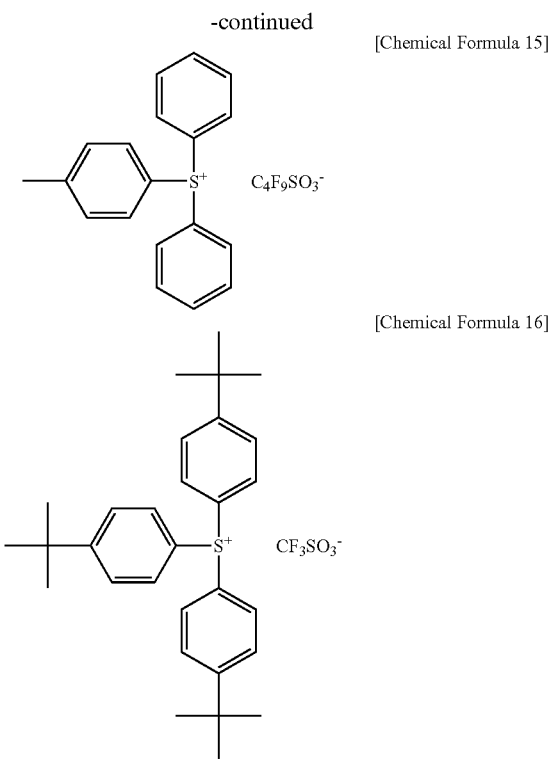

[Chemical Formula 15]

[Chemical Formula 16]

Using this composition, and with the exceptions of altering the prebake conditions and the PEB conditions as described below, a line and space (L&S) pattern was formed in the same manner as the example 1, thus producing a template.

The prebake conditions were set to 90 seconds at 130° C., and the PEB conditions were also set to 90 seconds at 130° C.

The exposure dose at which a 250 nm L&S pattern was produced with a 1:1 ratio was 40 mJ/cm$^2$.

When the thus produced template was used to produce a titania nanotube structure in a similar manner to the example 1, a three dimensional structure that retained the structural shape of the template could not be obtained, and a structure in which the rectangular pattern appeared to have folded over and collapsed was observed.

Comparative Example 2

Using a resist material comprising 100 parts by weight of a fluororesin (FPR-120, manufactured by Asahi Glass Co., Ltd.) with a weight average molecular weight of 25,200 and containing alcoholic hydroxyl groups represented by the chemical formula 17 shown below (m:n molar ratio=80:20), 4 parts by weight of triphenylsulfonium nonafluorobutanesulfonate as an acid generator, and 0.2 parts by weight of triisopropanolamine dissolved in 900 parts by weight of PGMEA, a line and space (L&S) pattern was formed in the same manner as the example 1, with the exceptions of altering the prebake conditions and the PEB conditions as described below, thus producing a template.

The prebake conditions were set to 90 seconds at 90° C., and the PEB conditions were set to 90 seconds at 110° C.

The exposure dose at which a 250 nm L&S pattern was produced with a 1:1 ratio was 7 mJ/cm$^2$.

When the thus produced template was used to produce a titania nanotube structure in a similar manner to the example 1, a structure was observed in which the tube walls displayed an overall level of distortion, with tube side walls contacting one another, and contact also occurring between the upper tube walls and the substrate surface, resulting in a structure comprising a series of collapsed tubes. In other words, a three dimensional structure that retained the structural shape of the template could not be obtained. The tube surfaces also displayed large quantities of irregularities.

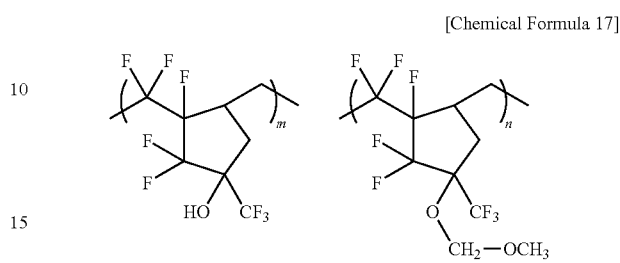

[Chemical Formula 17]

Example 7

No Oxygen Plasma Activation Treatment

By removing the resin 2 represented by the aforementioned chemical formula 9 from the metal oxide nanomaterial forming composition used in the example 1, so that only the resin 1 represented by the chemical formula 8 was used, and altering the values of n and m to 31 mol % (that is, a protection ratio of 31%) and 69 mol % (of phenolic units) respectively, a nanomaterial was produced using a metal oxide nanomaterial forming composition 3 with the composition shown below.

| | |
|---|---|
| resin 1 | 100 parts by weight |
| acid generator 1 from example 1 | 5 parts by weight |
| additive: triethanolamine | 0.1 parts by weight |
| solvent: PGMEA | 730 parts by weight |

The acid generator 1 is the compound shown above in the chemical formula 10.

First, this metal oxide nanomaterial forming composition 3 was applied to the surface of an 8-inch silicon wafer substrate using spin coating, and prebaking was then conducted for 90 seconds at 90° C., thus forming a film thickness of 500 nm.

This film was exposed using a KrF excimer laser exposure device FPA-3000EX3, manufactured by Canon Inc. (NA 0.6, σ0.65).

Following the completion of post exposure baking (PEB) for 60 seconds at 90° C., the film was developed for 30 seconds in a 2.38% by weight aqueous solution of tetramethylammonium hydroxide, thus forming a line and space pattern, and completing the template.

The pattern shape comprised rectangle-shaped lines with varying widths from 200 nm to 1.5 μm, a length of 5 mm and a height of 400 nm.

The exposure dose at which a 250 nm L&S pattern was produced with a 1:1 ratio between the line width and the distance between lines was 23 mJ/cm$^2$.

This completed the formation of a template on the substrate.

Subsequently, the substrate was immersed for 2 minutes in 7 ml of a solution (a 100 mM heptane solution) of titanium normal butoxide (Ti(O-nBu)$_4$), and was then washed by subsequent immersion for 10 seconds in 7 ml of heptane, and then a further 1 minute in 7 ml of heptane. The substrate was then dried under a stream of nitrogen gas, subsequently immersed for 1 minute in 7 ml of ion exchange water to hydrolyze the titanium normal butoxide adsorbed to the substrate surface, and then dried under a stream of nitrogen gas.

The combined operation described above of adsorbing the titanium normal butoxide, washing with heptane, drying under nitrogen gas, performing hydrolysis in ion exchange water, and then drying again under nitrogen gas (hereafter this combined operation is referred to as the "titania film lamination operation 2") was repeated 20 times.

Subsequently, the substrate was subjected to oxygen plasma treatment (30 W, 23.9 Pa (180 mTorr), 2 hours) to remove the template portion.

Figure 7A:
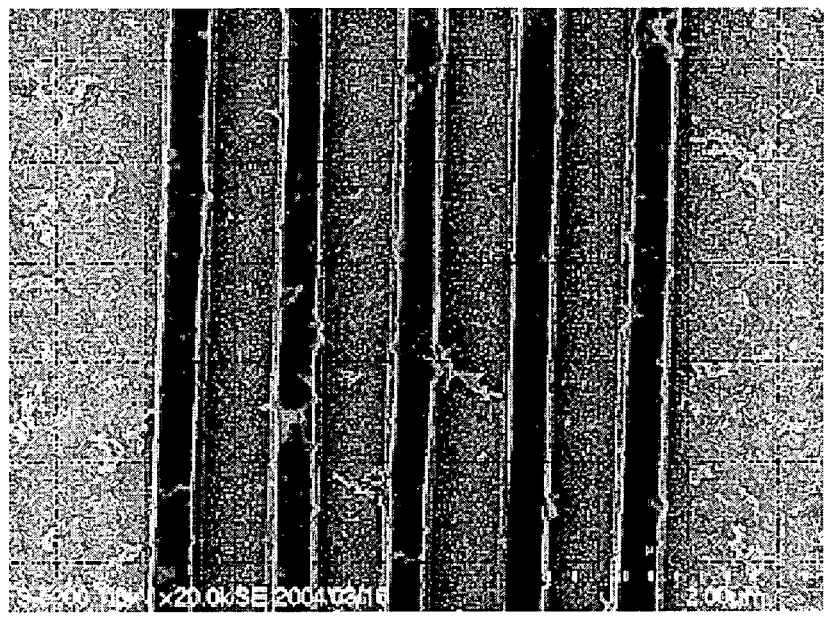
Figure 7B:
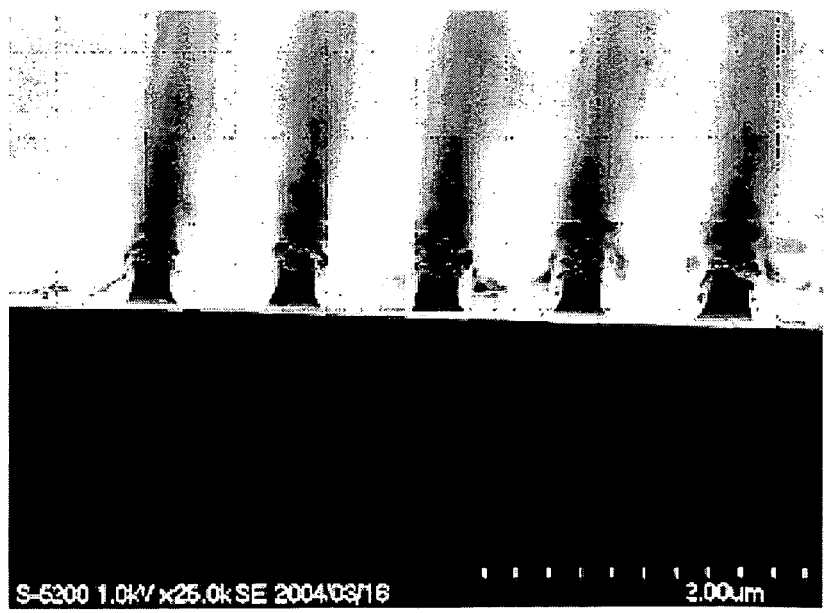

Scanning electron microscope images of portions of the thus obtained nanostructure are shown in FIG. 7. FIG. 7A represents a top view of the material and FIG. 7B represents a cross sectional view.

As can be seen in FIG. 7A and FIG. 7B, the product nanostructure displayed a little contraction, and was a titania nanotube structure with a film thickness of several dozen nm and a width of 250 nm which had retained the same rectangular structure as the template. Furthermore, because none of the template material can be seen within the titania nanotube structure, it is clear that the metal oxide nanomaterial forming composition was completely removed by the oxygen plasma treatment.

Example 8

Oxygen Plasma Activation Treatment

The same metal oxide nanomaterial forming composition as the example 7 was used to form a template on a substrate in the same manner as the example 7, and oxygen plasma treatment (10 W, 23.9 Pa (180 mTorr), 10 minutes) was then conducted to activate the surface of the template. Subsequently, the titania film lamination operation 2 described in the example 7 was repeated 20 times.

The substrate was then subjected to oxygen plasma treatment in the same manner as described in the example 7 (30 W, 23.9 Pa (180 mTorr), 2 hours) to remove the template.

Figure 8A:
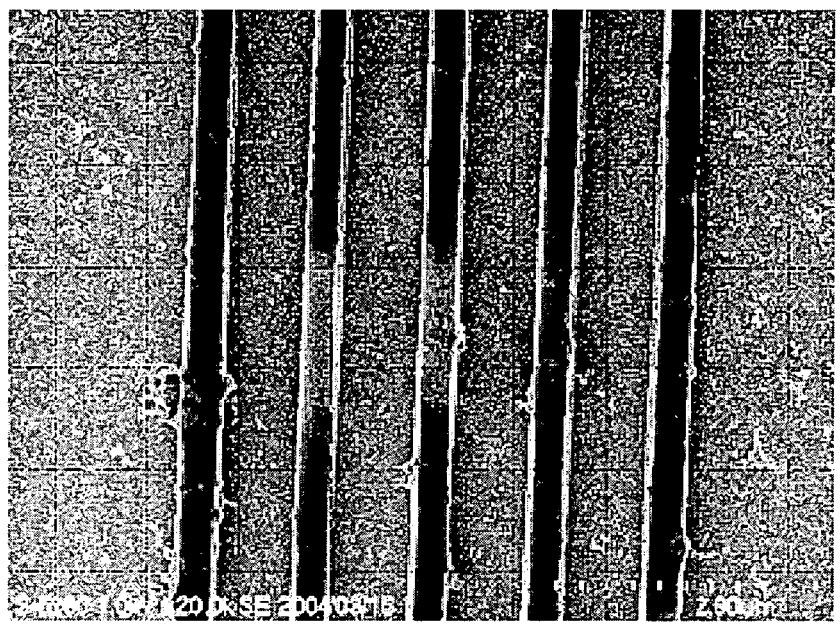
Figure 8B:
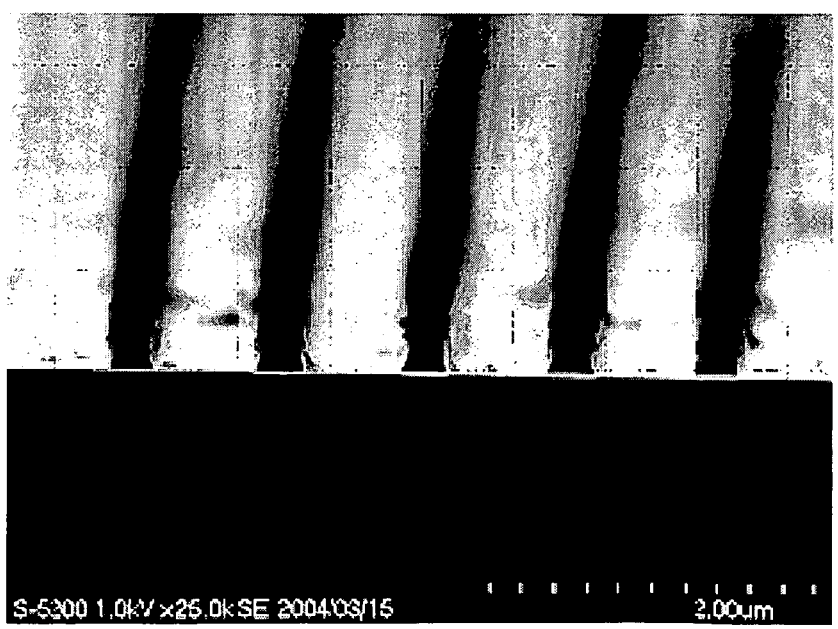

Scanning electron microscope images of portions of the thus obtained nanostructure are shown in FIG. 8. FIG. 8A represents a top view of the material and FIG. 8B represents a cross sectional view.

As can be seen in FIG. 8A and FIG. 8B, the product nanostructure displayed almost no contraction, and was a titania nanotube structure with a film thickness of several dozen nm and a width of 250 nm which had retained the same rectangular structure as the template. Furthermore, because none of the template material can be seen within the titania nanotube structure, it is clear that the metal oxide nanomaterial forming composition was completely removed by the oxygen plasma treatment.

What is claimed is:

1. A production method for a nanomaterial comprising the steps of:
    forming a template on a solid substrate using a metal oxide nanomaterial forming composition comprising an organic compound with a phenolic hydroxyl group and a molecular weight of at least 500 by a patterning process comprising preparing a microprocessed substrate having a fine pattern, and then pressing another substrate against the prepared substrate to transfer a fine pattern;
    forming a metal oxide layer on said template; and
    removing said template from the metal oxide layer to generate a metal oxide nanostructure.

2. A production method for a nanomaterial according to claim 1, wherein in said step for forming said template, a radiation sensitive composition is used as said metal oxide nanomaterial forming composition, and wherein the patterning is conducted using a lithography method.

3. A production method for a nanomaterial according to claim 1, wherein in said step for generating said metal oxide nanostructure, said solid substrate is removed following removal of said template.

4. A production method for a nanomaterial according to claim 1, wherein in said step for generating said metal oxide nanostructure, said solid substrate is removed prior to removal of said template.

5. A production method for a nanomaterial according to claim 1, wherein in said step for generating said metal oxide nanostructure, during removal of said template, an integrated body containing both said template and said solid substrate is removed.

6. A production method for a nanomaterial according to claim 1, further comprising a step for coating at least a portion of said metal oxide nanostructure with an organic compound layer.

7. A production method for a nanomaterial according to claim 1, wherein during said step for forming said metal oxide layer,
    a step (a), in which a material containing a metal compound with a functional group that undergoes a condensation reaction with a hydroxyl group, and a functional group that can generate a hydroxyl group through hydrolysis, is brought in contact with either said template surface or a surface of a metal oxide layer formed on top of said template,
    and a step (b), which is conducted after said step (a) and in which said metal compound is hydrolyzed to form a metal oxide layer,
    are each performed at least once.

8. production method for a nanomaterial according to claim 7, wherein in said step (a), said template surface is first subjected to preliminary oxygen plasma treatment.

9. A production method for a nanomaterial according to claim 1, wherein a method for removing said template uses at least one treatment method selected from a group consisting of plasma treatment, ozone oxidation, elution and calcination.

10. A production method for a nanomaterial according to claim 1, wherein said organic compound has a molecular weight greater than 2000, and contains at least 0.2 equivalents of phenolic hydroxyl groups.

11. A production method for a nanomaterial according to claim 1, wherein said organic compound is a resin with a weight average molecular weight of 2000 to 30,000, comprising a unit containing a phenolic hydroxyl group and a unit containing an acid dissociable, dissolution inhibiting group, and said unit containing a phenolic hydroxyl group accounts for at least 50 mol % of said resin.

12. A production method for a nanomaterial according to claim 11, wherein said unit containing a phenolic hydroxyl group is a unit derived from hydroxystyrene.

13. A production method for a nanomaterial according to claim 1, wherein the metal oxide nanomaterial forming composition is a radiation sensitive composition.

14. A production method for a nanomaterial according to claim 1, wherein said organic compound contains an acid dissociable, dissolution inhibiting group in addition to said phenolic hydroxyl group, and wherein said composition further comprises an acid generator.

* * * * *